US009857453B1

(12) United States Patent
DeSimone, Jr. et al.

(10) Patent No.: US 9,857,453 B1
(45) Date of Patent: Jan. 2, 2018

(54) HIGH-FREQUENCY INDICATOR PHASE SYSTEM AND METHOD

(71) Applicant: Lockheed Martin Corporation, Bethesda, MD (US)

(72) Inventors: Anthony J. DeSimone, Jr., Yardley, PA (US); Yusif K. Akhund, Mount Laurel, NJ (US); Jeffrey C. Falkenbach, Brookhaven, PA (US); Bruce C. Bergenfeld, Yardley, PA (US); Brian J. Quinn, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 457 days.

(21) Appl. No.: 14/319,794

(22) Filed: Jun. 30, 2014

(51) Int. Cl.
*G01S 7/32* (2006.01)
*G01S 7/02* (2006.01)
*G01S 13/02* (2006.01)

(52) U.S. Cl.
CPC .............. *G01S 7/02* (2013.01); *G01S 13/02* (2013.01)

(58) Field of Classification Search
CPC .......... G01S 7/02; G01S 7/292–7/2927; G01S 7/354; G01S 7/414; G01S 7/032; G01S 7/03; G01S 7/282; G01S 13/02; G01S 13/36; G01S 13/50; G01S 13/52; G01S 13/524; G01S 13/5244; G01S 13/58–13/584; G01S 13/34; G01S 13/931; G01S 2007/356; G01S 13/92; G01S 13/46
USPC ........................................ 342/175, 104, 196
See application file for complete search history.

(56) References Cited

U.S. PATENT DOCUMENTS

| 3,703,722 | A | * | 11/1972 | Gershberg | ............. | G01S 13/56 340/554 |
| 4,318,099 | A | * | 3/1982 | Hsiao | .................... | G01S 13/526 342/160 |
| 4,490,718 | A | * | 12/1984 | Opitz | ..................... | G01S 7/415 342/192 |
| 4,958,638 | A | * | 9/1990 | Sharpe | ................. | A61B 5/0205 600/407 |
| 5,086,775 | A | * | 2/1992 | Parker | .................... | G01H 9/008 600/438 |
| 5,103,233 | A | * | 4/1992 | Gallagher | .............. | G01S 13/22 342/158 |
| 5,381,154 | A | * | 1/1995 | Guerci | .................... | G01S 7/412 342/204 |

(Continued)

FOREIGN PATENT DOCUMENTS

SE    EP 2041600 B1 * 9/2014 ............. G01S 13/10

*Primary Examiner* — Peter M Bythrow
*Assistant Examiner* — Nuzhat Pervin
(74) *Attorney, Agent, or Firm* — Howard IP Law Group, PC

(57) ABSTRACT

A radar system includes a transmitter configured to generate a series of electromagnetic pulses, and a receiver configured to receive return signals reflected by an object of interest from the series of electromagnetic pulses. A phase processor is operatively connected to the output of the receiver and configured to extract phase data as a function of time from the received return signals, convert the extracted phase data to the frequency domain, and analyze the phase data to identify phase changes indicative of one or more types of motion, such as complex or simple dynamic motion of the object of interest.

18 Claims, 5 Drawing Sheets

(56) References Cited

U.S. PATENT DOCUMENTS

| | | | | |
|---|---|---|---|---|
| 5,497,158 A * | 3/1996 | Schmid | G01S 13/9035 | 342/25 F |
| 5,559,417 A * | 9/1996 | Sears | G01C 19/30 | 318/689 |
| 5,877,804 A * | 3/1999 | Otsuki | G08B 13/19602 | 348/143 |
| 6,097,329 A * | 8/2000 | Wakayama | G01S 13/22 | 342/104 |
| 6,426,718 B1 * | 7/2002 | Ridgway | G01S 13/534 | 342/159 |
| 6,437,728 B1 * | 8/2002 | Richardson | G01S 7/412 | 342/25 A |
| 6,833,808 B2 * | 12/2004 | Rees | G01S 13/534 | 342/159 |
| 7,394,422 B2 * | 7/2008 | Nohmi | G01S 7/35 | 342/107 |
| 7,679,545 B2 * | 3/2010 | Rausch | G01S 7/415 | 342/114 |
| 7,812,758 B2 * | 10/2010 | Morris | G01S 13/003 | 342/25 A |
| 7,872,604 B2 * | 1/2011 | Wu | G01S 7/025 | 342/27 |
| 7,903,024 B2 * | 3/2011 | Tietjen | G01S 13/28 | 342/160 |
| 7,978,124 B2 * | 7/2011 | Cook | G01S 13/5242 | 342/160 |
| 7,990,308 B2 * | 8/2011 | Birdsong, Jr. | G01S 7/282 | 342/196 |
| 8,193,968 B1 * | 6/2012 | Kia | B64G 3/00 | 342/118 |
| 8,581,777 B2 * | 11/2013 | Kanamoto | G01S 3/74 | 342/118 |
| 8,648,745 B2 * | 2/2014 | Kanamoto | G01S 3/74 | 342/108 |
| 8,665,098 B2 * | 3/2014 | Jau | A61B 5/0205 | 340/429 |
| 8,708,919 B1 * | 4/2014 | Frazier | A61B 5/0015 | 600/484 |
| 8,803,732 B2 * | 8/2014 | Antonik | G01S 7/282 | 342/160 |
| 9,019,149 B2 * | 4/2015 | Bangera | G06Q 30/02 | 342/176 |
| 9,019,150 B2 * | 4/2015 | Alalusi | G01S 7/03 | 342/118 |
| 9,075,143 B2 * | 7/2015 | Brundick | G01S 13/878 | |
| 9,164,168 B2 * | 10/2015 | Petkie | A61B 5/024 | |
| 9,170,320 B1 * | 10/2015 | Stockmann | G01S 7/2813 | |
| 9,316,727 B2 * | 4/2016 | Sentelle | G01S 13/32 | |
| 2003/0210174 A1 * | 11/2003 | Nakamura | G01S 13/584 | 342/70 |
| 2005/0128123 A1 * | 6/2005 | Greneker, III | A61B 5/0507 | 342/22 |
| 2005/0156780 A1 * | 7/2005 | Bonthron | G01S 3/48 | 342/107 |
| 2006/0220946 A1 * | 10/2006 | Nohmi | G01S 7/35 | 342/107 |
| 2008/0195261 A1 * | 8/2008 | Breed | B60R 21/0132 | 701/2 |
| 2010/0073218 A1 * | 3/2010 | Stockmann | G01S 13/5248 | 342/146 |
| 2010/0214154 A1 * | 8/2010 | Birdsong, Jr. | G01S 13/887 | 342/90 |
| 2012/0038506 A1 * | 2/2012 | Kanamoto | G01S 3/74 | 342/158 |
| 2013/0001422 A1 * | 1/2013 | Lavon | A61B 5/0205 | 250/338.1 |
| 2013/0278455 A1 * | 10/2013 | Song | G01S 13/22 | 342/137 |
| 2014/0063247 A1 * | 3/2014 | Bernal | G06K 9/00785 | 348/148 |
| 2014/0320333 A1 * | 10/2014 | Sugiyama | G01S 13/02 | 342/81 |
| 2015/0009330 A1 * | 1/2015 | Sobue | G08G 1/166 | 348/148 |
| 2015/0018676 A1 * | 1/2015 | Barak | A61B 5/02444 | 600/430 |
| 2015/0182855 A1 * | 7/2015 | Tolk | A63F 13/211 | 463/31 |
| 2015/0339529 A1 * | 11/2015 | Ishihara | H04N 1/00 | 382/103 |

* cited by examiner

HIGH-FREQUENCY INDICATOR PHASE SYSTEM AND METHOD

FIELD OF THE INVENTION

The present invention relates to signal processing systems and methods for use in radar applications, and more particularly, to systems and methods for analyzing phase changes in complex return data received by radar systems.

BACKGROUND

Radar systems are useful for detecting, characterizing and monitoring various kinematic parameters associated with natural and/or man-made objects and are critical to both civilian and military operations. These systems typically transmit "beams" or electromagnetic (EM) signals intended to engage one or more objects or targets, and process reflected return signals (or echoes) for measuring spatial features, object identification and characterization. A radar echo return usually contains both signals generated from a desired target, as well as background clutter. Clutter returns arise from reflections from stationary and/or moving background objects (e.g. precipitation, terrain, debris etc.). This clutter decreases radar performance by hindering the system's ability to detect true targets and/or increases the probability of undesirable target detections.

Numerous methods exist which attempt to discriminate between unwanted clutter and return signals resulting from desired targets. Many of these employ clutter cancellation methods that rely on the principle that moving targets have a Doppler frequency shift, while stationary targets do not. Thus, pulse-Doppler radar systems may implement a plurality of Doppler frequency filters (e.g. FFT networks) used to divide the Doppler frequency space into many narrow regions, with each filter corresponding to one of these frequency bands. Knowing the frequency space normally associated with specific clutter types, these Doppler filters can be used to discriminate against clutter, as well as identify target Doppler frequency.

Processing may also be used to discriminate between moving targets of interest and unwanted objects or clutter displaying similar velocity profiles. Current systems rely on the analysis of radar cross-section or an object's kinematics (e.g. its velocity or Doppler) and derived acceleration characteristics in the time domain for discrimination between true targets and unwanted clutter with characteristics resembling desirable targets. However, these systems are unable to discriminate between objects with simple dynamic motions, and those having complex dynamic motions. More specifically, these systems lack the ability to, for example, to distinguish between an object maintaining a fixed attitude (i.e. simple dynamic motion), such as an aircraft, from objects possessing no method of attitude control and whose motion is purely random (i.e. complex dynamic motion), such as debris.

Accordingly, improved systems and methods for discriminating between objects displaying simple and complex dynamic motion are desired.

SUMMARY

In one embodiment of the present disclosure, a radar system is provided. The system includes a transmitter configured to generate a predetermined number of electromagnetic pulses and a receiver. A phase processor is responsive to the output of the receiver and configured to extract phase data as a function of time from a received return signal associated with at least one of the predetermined number of electromagnetic pulses, convert the extracted phase data to the frequency domain, and analyze the converted phase data to identify phase changes indicative of a type of motion (e.g. identify one of complex or simple dynamic motion).

In one embodiment, a method of distinguishing between different types of target motion in radar return signals comprises: transmitting a predetermined number of electromagnetic pulses; receiving a return signal from at least one of the transmitted electromagnetic pulses; identifying a potential target from the return signal; extracting phase data as a function of time from the return signal associated with the identified target; converting the extracted phase data to the frequency domain, and analyzing the converted phase data to identify phase changes indicative of one type of motion of the identified target (e.g. identify one of complex or simple dynamic motion).

DETAILED DESCRIPTION

Figure 1:
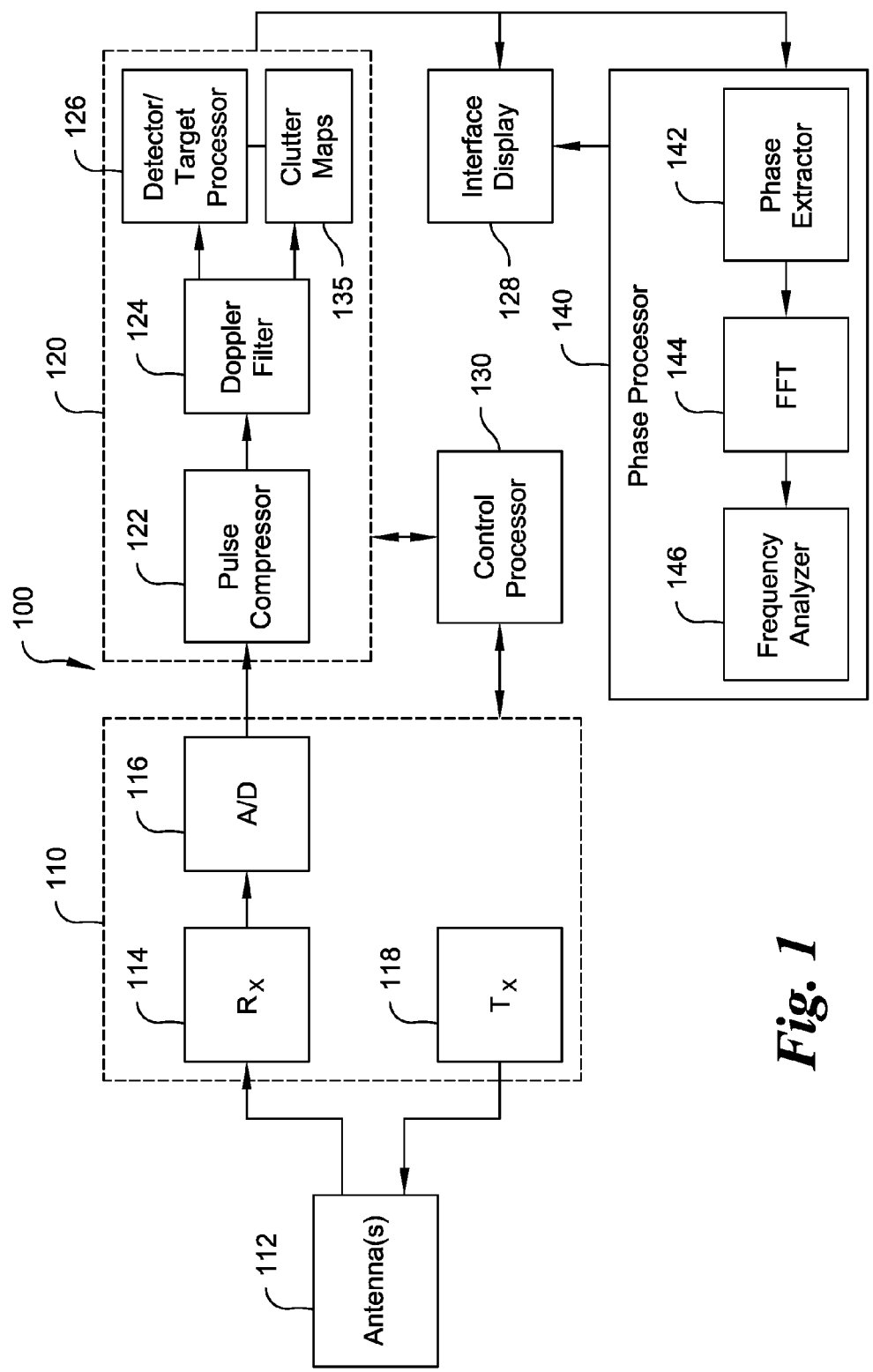
FIG. 1 is a simplified block diagram of a radar and signal processing system according to an embodiment of the present disclosure.

It is to be understood that the figures and descriptions of the present invention have been simplified to illustrate elements that are relevant for a clear understanding of the present invention, while eliminating, for purposes of clarity, many other elements found in typical remote sensing systems, such as pulse and pulse-Doppler radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Algorithms according to embodiments of the present disclosure analyze the phase characteristics of radar return signals in order to discriminate between objects with simple versus complex structure and dynamics. In one embodiment, a radar system is provided for generating a multi-pulse burst of EM signals. Received reflected return signals may be processed conventionally through a receiver. This processing may include, but is not limited to, Doppler filtering and subsequent target detection processing based on, for example, the amplitude and phase of the complex return signal data.

After target detection processing and prior to phase processing according to embodiments of the present disclosure, return pulses associated with an identified target are time-aligned, and known phase changes or offsets (i.e. measured velocity indicated by a measured Doppler shift) may be corrected by the time delay for each pulse to reflect from the target. This may be achieved by, for example, using range and range rate estimates from the Doppler-based detection processing as described, along with range acceleration estimates to correct for Doppler shifts in pulse compressed data. In this way, the complex return signals are analyzed only for a target's contribution to phase changes. In a subsequent step, the phase of the return signals is computed for each pulse. The phases are next unwrapped to remove discontinuities causing phase jumps at the two extremes of the 360 degree phase space. Pulse-to-pulse phase fluctuations are assessed in the frequency domain using a normalized FFT. An average may be taken across the higher frequency bins (e.g. the top 10%) to measure the amount of high frequency content due to jitter or variation in the phase on a pulse-to-pulse basis. It should be noted that the specific frequency range is a tunable parameter of the algorithms described herein, and is employed based on maximizing separability among spectral content of the targets in question. A return signal dominated by noise or incoherent pulse-to-pulse phase variation (e.g. an unstable object exhibiting complex dynamic motion) will tend to yield larger values in the high-frequency bins, while a return that is coherent (e.g. a stable object exhibiting simple dynamic motion) will tend to exhibit smaller values in the high-frequency bins. In this way, averaging phase over the high frequency spectral region shows significant separability between objects with complex dynamics compared to stable dynamic objects.

Referring generally to FIG. 1, embodiments of the present disclosure will be described herein as implemented into an exemplary pulse-Doppler radar system. As will be understood by one of ordinary skill in the art, a pulse-Doppler radar system 100 may comprise a front-end module 110, including a transmitter 118 responsive to a control processor 130 for generating and transmitting a series of defined waveforms from an antenna 112. As set forth above, these waveforms may take the form of signal bursts comprising a plurality of EM pulses. Reflected return signals from each burst are subsequently captured by antenna 112 and provided to at least one receiver 114 for signal modulation. Receiver 114 may include various processing components, such as one or more filters, a low-noise amplifier and a down converter, as will be understood by one of ordinary skill in the art. At least one analog to digital converter (ADC) 116 is provided for converting received analog return signals to digital form. A duplexer or switching element (not shown) may also be provided for disconnecting transmitter 118 to establish a path to the receiver 114 between transmission and reception operations. Control processor 130 may be configured to control the functionality of the above-described embodiments. For example, control processor 130 may be used to control the on and off timing of the receiver/ADC 114,116. Moreover, control processor 130 may be responsive to the transmitter for correlating a given transmitter output pulse and received return pulse, on a pulse-by-pulse basis within a coherent interval.

System 100 may also include, by way of non-limiting example, a digital processing system 120, including a pulse compression module 122 operative to receive post-A/D digitized in-phase and quadrature-phase (I/Q) signal data from front end module 110. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

The output of pulse compression module 122 comprises modulated data which may be subject to further processing, such as sampling the incoming data into range cells or bins, and generating one sample in each range bin for each pulse. Range bin data can then be provided to Doppler filters 124 which generate a series of Doppler bins for each range cell (note: Doppler filtering is not essential to computing the Hi-FI Phase algorithm). Data from a particular Doppler bin corresponds to a signal from a target or background, at a given range, moving at a particular speed. Once Doppler-filtered, return data is provided to a detection processor 126 operative to, for example, perform a target detection process against a time-averaged background map 135. These detection processes may include one of more of "greatest of" operations, as well as constant false alarm rate (CFAR) processing by comparing the powers of each range/Doppler cell to a background clutter map (e.g. clutter maps 135). The results of this detection processing may be provided to a display device 128 for end-user interfacing.

Still referring to FIG. 1, in one exemplary embodiment, after initial target detection processing has taken place, return data associated with an identified target may be provided to a phase processor 140 for phase processing operations according to embodiments of the present disclosure. While the embodiments of the present disclosure will be described herein as applied to return signal data associated with a detected target (or suspected target), other embodiments may apply the phase processing methods described herein to all return signal data. Phase processor 140 may be configured to align the identified return pulses, and remove any known phase changes (i.e. known velocity detected in the above-described Doppler filtering operations). This may be achieved by, for example, using range and range rate estimates from the Doppler-based detection processing described above, along with range acceleration estimates to correct for Doppler shifts in pulse compressed data. In this way, return data may be analyzed for only the target's contribution to phase.

As set forth above, algorithms according to embodiments of the present disclosure are configured to examine phase characteristics of radar return signals. In one embodiment, phase processor 140 includes a phase extractor or processor 142 configured to identify phase data contained in the received return signal. This may be achieved by calculating the phase of the real and imaginary components of the complex return data, z[n] according to the following relationship, wherein $\phi_{wrapped}[n]$ is the phase of the $n^{th}$ sample in the time domain:

$$\phi_{wrapped}[n] = A\ TAN\ 2(\text{imag}(z[n]), \text{real}(z[n]))\quad \text{Eq. 1}$$

Typical phase computations of a rotating object result in continuously repeating phase variations from −180 to +180 degrees as the object rotates. These erratic variations in phase result in high frequency artifacts not consistent with the object's real motion, causing confusion with the true high frequency returns of an object displaying complex motion. To prevent this problem, it is beneficial to recognize that this cyclic pattern of a rotating object and attempt to unwrap the repeating phase data such that the phase values continue to increase as they go around the circle. For example, if an object's phase goes one degree past 360 degrees, the phase will be unwrapped to 361 degrees (instead of to one degree), and so on up to N degrees. Thus, periodic phase data $\phi_{wrapped}[n]$ may be "unwrapped" or converted to a continuous function of time for a given burst according to:

$$w[n] = \left[\frac{\phi_{wrapped}[n] - \bar{\phi}_{prev}[n]}{2\pi} + .5\right],\ \text{with}\quad \text{Eq. 2}$$

$$\phi[n] = \phi_{wrapped}[n] - 2\pi w[n]\quad \text{Eq. 3}$$

The pulse-to-pulse phase variation (after the above correction for target motion) of ordinary rotating objects has less high frequency content than an object possessing complex dynamics. Unwrapped, aligned phase vs. time return pulses may be converted to the frequency domain by an FFT 144:

$$\Phi[k] = \sum_{n=1}^{N} \phi[n] e^{-j\frac{2\pi kn}{N}}\quad \text{Eq. 4}$$

From this frequency domain return data, a frequency analyzer 146 may be provided, and configured to analyze the frequency data, including identifying controlled motion indicated by periodic phase, as well as uncontrolled motion indicated by evenly distributed phase vs. frequency.

In one embodiment, the mean of high frequency spectral content may be computed by frequency analyzer 146 according to:

$$\Phi_{HF} = \frac{1}{k_{max} - k_{min} + 1}\sum_{k=k_{min}}^{k_{max}} |\Phi[k]|\quad \text{Eq. 5}$$

The phase measurements are then normalized based on the number of pulses to account for independent noise on each pulse summed in the FFT:

$$\Phi_{HF} = \frac{1}{\sqrt{N}}\Phi_{HF}\quad \text{Eq. 6}$$

Finally, frequency analyzer 146 may perform a thresholding operation, wherein frequencies deemed to be too high (e.g. the top 2% of the band in question) are screened. The specific frequency range is a tunable parameter of the algorithm to be employed based on maximizing separability among spectral content of the targets in question. As described above, averaging over the high frequency spectral region shows significant separability between objects with complex dynamics compared to stable dynamic objects. The results of the above phase analysis, including the identification of targets displaying controlled motion, may be provided to a user via interface 128.

Figure 2:
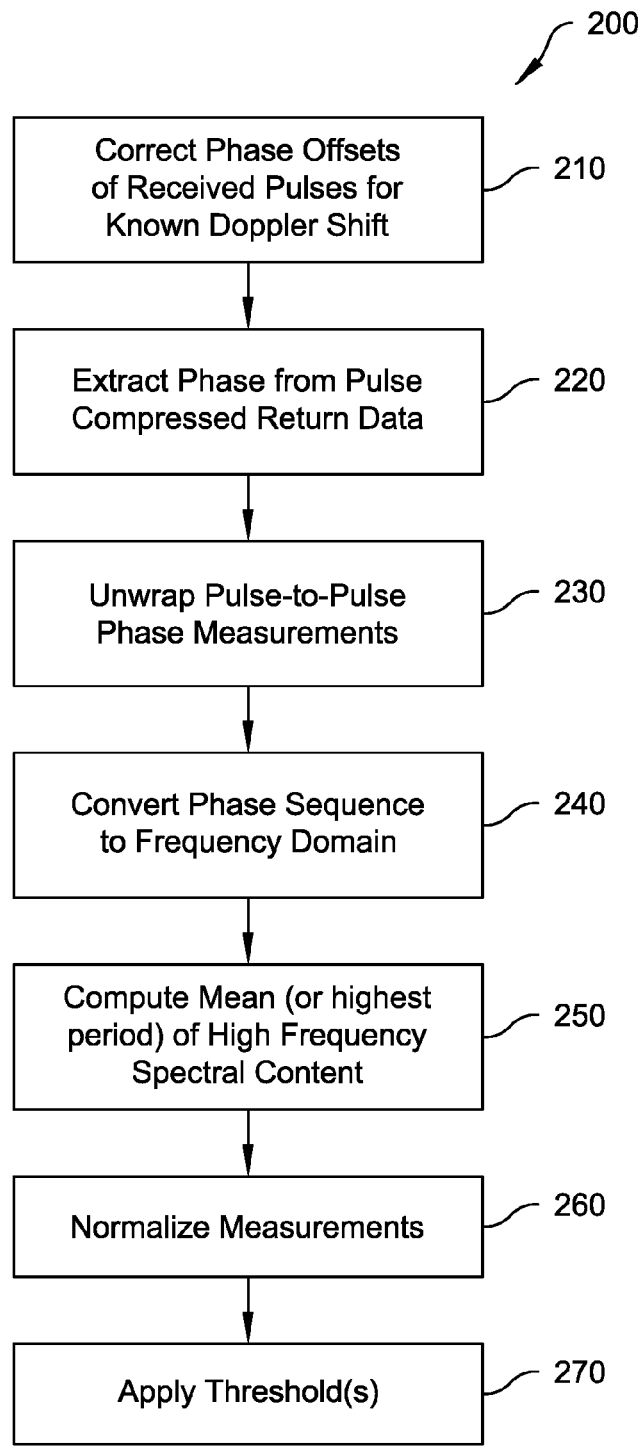
FIG. 2 is a process flow diagram illustrating an exemplary phase processing method according to an embodiment of the present disclosure.

FIG. 2 is a process flow diagram illustrating an exemplary phase processing method 200 according to an embodiment of the present disclosure. In step 210, phase data from received radar return signals is corrected for any known phase offsets (e.g. known Doppler shift), and phase information extracted therefrom (step 220). In one embodiment, this step includes calculating the phase of the real and imaginary components of the complex radar return signal. In step 230, the periodic pulse-to-pulse phase measurements are unwrapped, or converted to a continuous function with respect to time. This function can be converted to the frequency domain using, for example, an FFT function in step 240. Embodiments of the present disclosure may then be configured to identify periodic behavior in the phase data which may indicate a particular type of motion, or discriminate between two or more types of motion. For example, embodiments may be configured to identify phase data indicating controlled motion, or to identify even distributions of phase vs. frequency, indicative of uncontrolled motion. This process may be accomplished by, for example, computing a mean of the high frequency spectral content of the return data (step 250), which may be normalized by a given number of pulses (step 260). Finally, in step 270, a threshold operation is applied, wherein a comparison between the normalized mean frequency data and a predetermined exemplary frequency range is performed. Frequencies above or below the predetermined range may be ignored, however this step is not essential to the use of the Hi-FI Phase.

Figure 3:
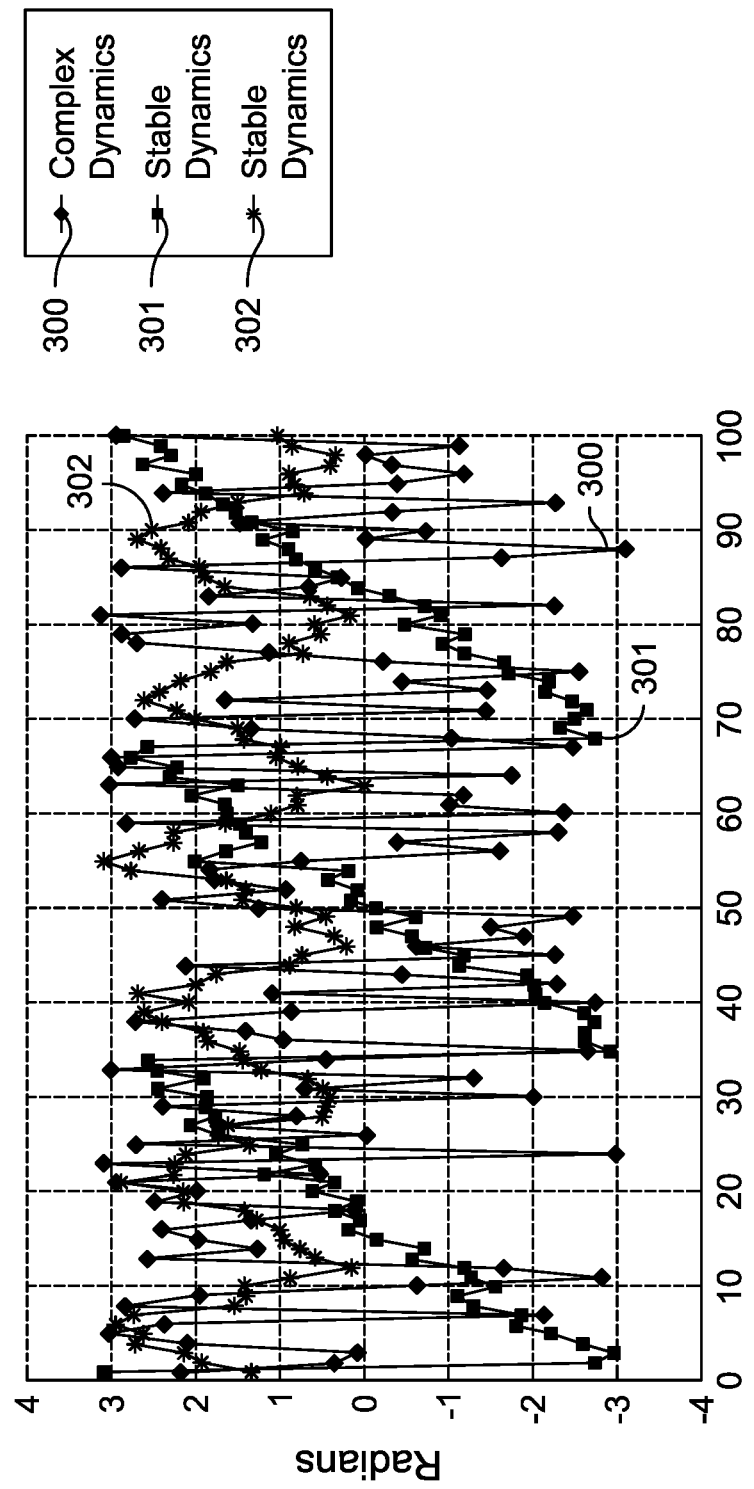
FIG. 3 is a graphical illustration of exemplary phase responses of objects in varying dynamic states.
Figure 4:
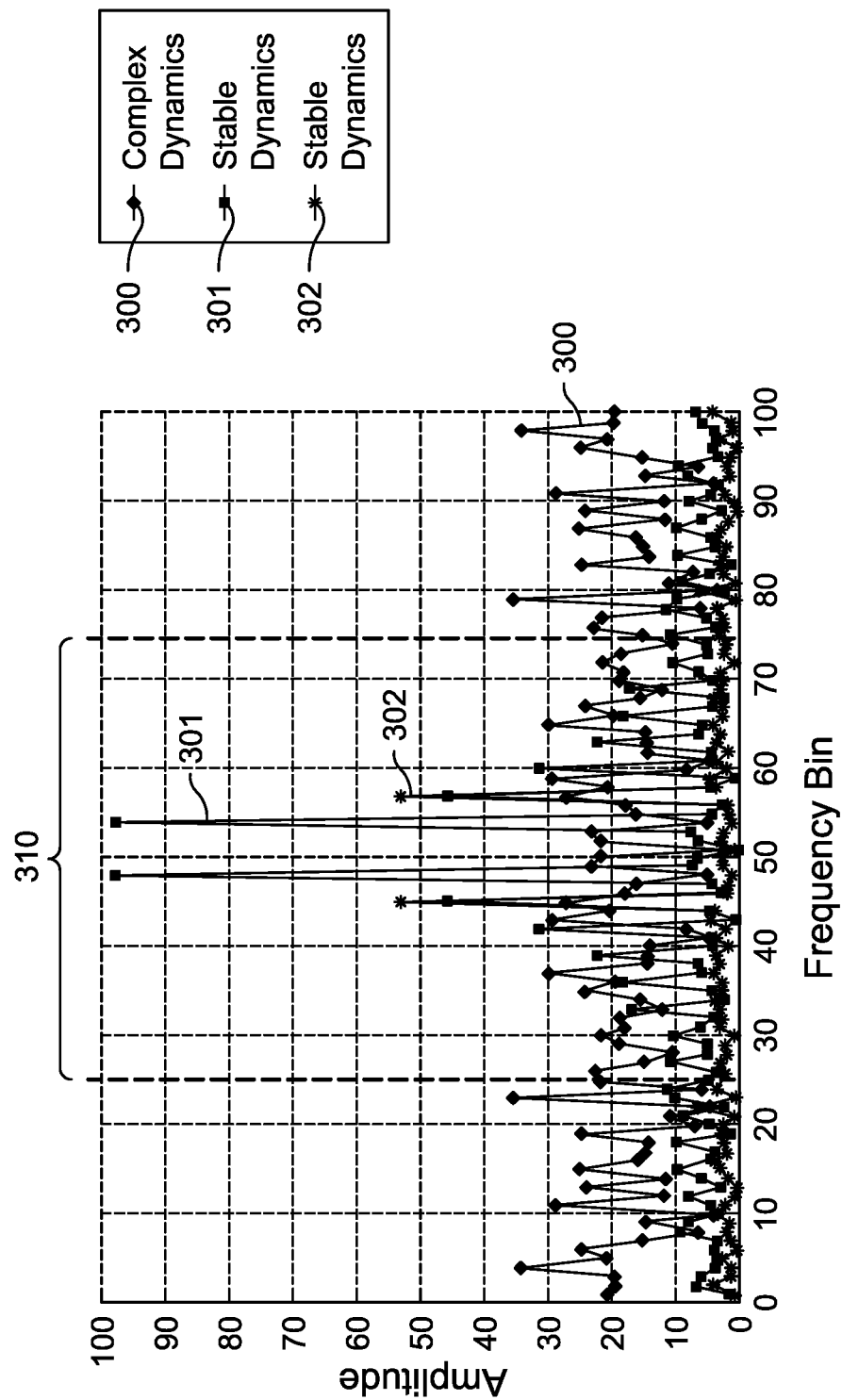
FIG. 4 is a graphical illustration of the frequency response of an exemplary phase measurement process according to an embodiment of the present disclosure.
Figure 5:
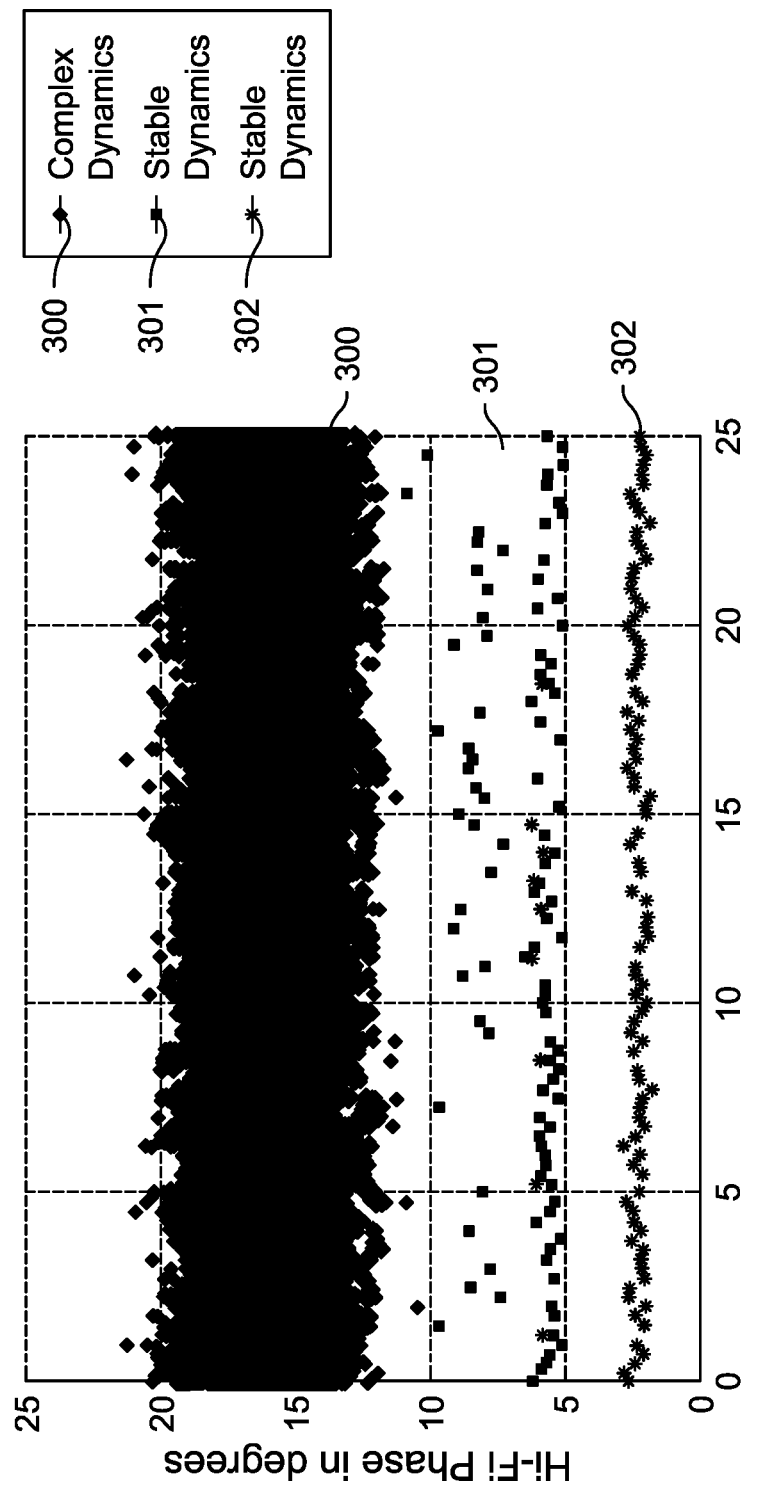
FIG. 5 is a graphical illustration of a Monte Carlo simulation of complex and stable dynamic objects.

Referring generally to FIGS. 3-5, the results of an exemplary phase processing method according to embodiments of the presents disclosure are illustrated. Referring generally to FIG. 3, the pulse-to-pulse phase variation of three dynamic objects including an object 300 illustrating complex dynamic motion, and objects 301,302 illustrating stable dynamic motions, is shown. As illustrated, the phase variation for objects in complex dynamic motion may be noise-like in nature, whereas the phase variation of the objects in stable dynamic motion tend to be periodic in nature. FIG. 4 illustrates the return data associated with each of objects 300,301,302 after the above-described FFT processing. As illustrated, objects 301,302 under stable dynamic motion illustrate periodic phase changes, compared to the evenly-distributed phase frequency of object 300 under complex dynamic motion. Thresholding techniques, including a threshold window 310 may be applied to the frequency domain data to analyze data appearing in select frequency ranges (e.g. the illustrated high frequency region within threshold window 310), while ignoring higher frequency data. FIG. 5 illustrates a Monte Carlo simulation showing the averaging of the phase data over these frequency regions. As shown, object 300 under complex motion shows significant separability to objects 301,302 under stable dynamic motion. This separability may be used as the basis for a more discriminating target detector, for example, by ignoring identified targets displaying unstable complex dynamic motion.

The embodiments are provided by way of example only, and other embodiments for implementing the methods described herein may be contemplated by one of skill in the pertinent art without departing from the intended scope of this disclosure. For example, systems, including the phase processor, may include memory containing data, which may include instructions, the instructions when executed by a processor or multiple processors, cause the steps of a method for performing the signal processing and phase analysis set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A radar system comprising:
   a transmitter for generating a predetermined number of electromagnetic pulses;
   a receiver;
   a signal processing system operatively connected to the receiver and configured to identify return signals associated with a target, and determine the radial velocity of the target; and
   a phase processor responsive to the signal processing system and configured to:
   extract phase data as a function of time from a received return signal associated with the target,
   convert the extracted phase data to the frequency domain,
   analyze the converted phase data to identify phase changes indicative of a type of motion of the target,
   wherein the phase changes indicative of a type of motion are independent of phase changes indicative of the radial velocity of the target.

2. The system of claim 1, wherein the signal processing system includes a target detection processor.

3. The system of claim 2, wherein the phase processor is operatively connected to an output of the target detection processor for performing the steps of extracting phase data, converting the extracted phase data, and analyzing the converted phase data from the identified return signals associated with the target.

4. The system of claim 1, wherein the step of extracting the phase data as a function of time includes the step of removing known phase changes indicative of the radial velocity of the target from the received return signal.

5. The system of claim 1, wherein the phase processor is further configured to perform the step of calculating a mean frequency of the extracted phase data.

6. The system of claim 1, wherein the received return signal is associated with at least one of the predetermined number of electromagnetic pulses, and wherein the phase processor is further configured to perform the step of normalizing the extracted phase data according to the predetermined number of electromagnetic pulses.

7. The system of claim 1, wherein the step of analyzing the converted phase data to identify phase changes indicative of a type of motion includes comparing the frequency of the converted phase data to a predetermined threshold value.

8. The system of claim 7, wherein the phase processor is further configured to associate converted phase data having a frequency above the predetermined threshold value with complex dynamic motion, and associate converted phase data having a frequency below the predetermined threshold value with simple dynamic motion.

9. A method of distinguishing between types of target motion in radar return signals with a radar system comprising:
   transmitting a predetermined number of electromagnetic pulses;
   receiving, with a receiver of the radar system, a return signal from at least one of the transmitted electromagnetic pulses;
   identifying a target from the return signal;
   determining a radial velocity of the identified target;
   with at least one phase processor of the radar system:
   extracting phase data as a function of time from the return signal associated with the identified target;
   removing known phase changes indicative of the determined radial velocity of the target from the extracted phase data;
   converting the extracted phase data with known phase changes removed to the frequency domain; and
   analyzing the converted phase data to identify phase changes indicative of a type of motion of the identified target.

10. The method of claim 9, wherein the step of extracting the phase data as a function of time includes the steps of:
    calculating the periodic phase of the return signal; and
    converting the periodic phase data to a continuous function of time.

11. The method of claim 9, further comprising the step of calculating a mean frequency of the extracted phase data.

12. The method of claim 9, further comprising the step of normalizing the extracted phase data according to the predetermined number of transmitted electromagnetic pulses.

13. The method of claim 9, wherein the step of analyzing the converted phase data to identify phase changes indicative of a type of motion includes comparing the frequency of the converted phase data to a predetermined threshold value.

14. The method of claim 13, wherein the step of analyzing the converted phase data to identify phase changes indicative of a type of motion includes associating converted phase data having a frequency above the predetermined threshold value with complex motion, and associating converted phase data having a frequency below the predetermined threshold value with simple dynamic motion.

15. The system of claim 1, wherein the step of analyzing the converted phase data to identify phase changes indicative of a type of motion includes associating the converted phase data with a first type of non-zero motion if the converted phase data comprises a frequency above a predetermined threshold value, and associating the converted phase data with a second non-zero type of motion if the converted phase data comprises a frequency below the predetermined threshold value.

16. The method of claim 9, wherein the step of analyzing the converted phase data to identify phase changes indicative of a type of motion of the identified target includes associating the converted phase data with a first type of non-zero motion if the converted phase data comprises a frequency above a predetermined threshold value, and associating the converted phase data with a second type of non-zero motion if the converted phase data comprises a frequency below the predetermined threshold value.

17. The method of claim 9, wherein the phase changes indicative of a type of motion are independent of phase changes indicative of the radial velocity of the identified target.

18. The system of claim 4, wherein the step of extracting the phase data as a function of time further includes the steps of:

calculating periodic phase data of the received return signal; and converting the periodic phase data to a continuous function of time.

\* \* \* \* \*